United States Patent

Tibbets

[11] 3,954,327
[45] May 4, 1976

[54] DOCUMENT READING APPARATUS

[76] Inventor: David W. Tibbets, 606 W. 81st St., Apt. E405, Hialeah, Fla. 33014

[22] Filed: Apr. 18, 1974

[21] Appl. No.: 461,967

[52] U.S. Cl. ............................. 350/298; 350/296; 350/301
[51] Int. Cl.² ............................................. G02B 5/12
[58] Field of Search .... 350/137, 288, 293, 296–298, 350/301, 305; 351/158

[56] References Cited
UNITED STATES PATENTS

| | | | |
|---|---|---|---|
| 582,719 | 5/1897 | Chenoweth et al. | 351/158 |
| 1,065,845 | 6/1913 | Sauvagé | 350/296 X |
| 2,363,427 | 11/1944 | Langberg | 350/301 X |
| 2,502,224 | 3/1950 | Kozloff | 350/298 |
| 3,671,117 | 6/1972 | Tibbets | 353/28 |

FOREIGN PATENTS OR APPLICATIONS

| | | | |
|---|---|---|---|
| 1,236,807 | 3/1967 | Germany | 351/158 |

*Primary Examiner*—John K. Corbin
*Assistant Examiner*—F. L. Evans

[57] ABSTRACT

A document reading apparatus is disclosed which is worn on the head of a user in the manner of a pair of spectacles and which comprises an elongated frame having a near end worn in front of and close to the face of a user and a far end worn in front of and remote from the face of a user, a pair of temples connected to the near end of the frame and engageable over the ears of a user, a pair of spaced nose pads depending centrally from the near end of the frame between the temples and adapted to rest on the nose of a user, a document holder supported on and above the frame, and at least one mirror supported on the frame for reflecting the image appearing on a document held by the document holder into the eyes of a user. In one embodiment of the apparatus for reading a document having a reversed image the document holder is an upright panel supported on and across the near end of the frame, and a single mirror is supported across the remote end of the frame facing the document holder and user. In a second embodiment of the apparatus for reading a document having an erect image a pair of mirrors are provided, one across the near end of the frame and the other across the far end of the frame facing each other. The document holder of the second embodiment is a transparent panel supported in a downwardly inclined position across the top edges of the two mirrors. A document supported on top of the transparent panel with its indicia face down is viewed by the near mirror which reflects a reversed image of the document toward the remote mirror, the remote mirror in turn erects the image received from the near mirror and reflects the erected image into the eyes of the user.

7 Claims, 13 Drawing Figures

U.S. Patent   May 4, 1976   Sheet 1 of 2   3,954,327
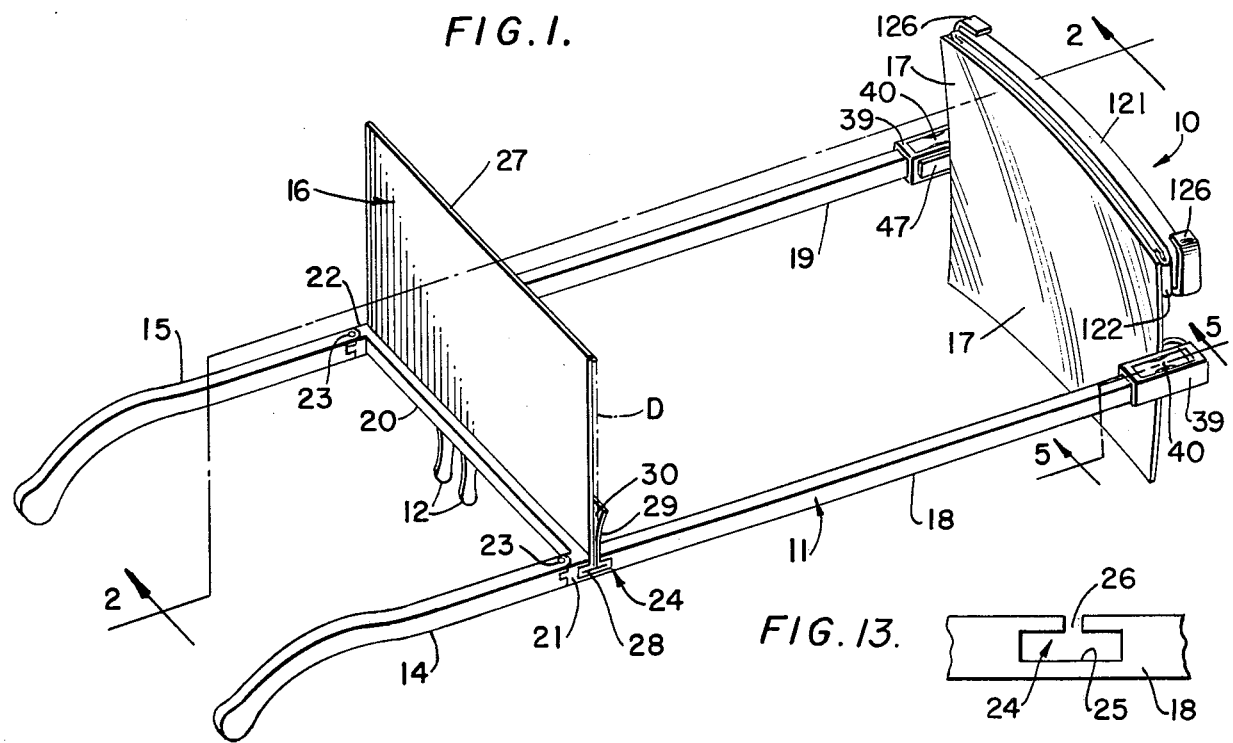
FIG.1.
FIG.13.
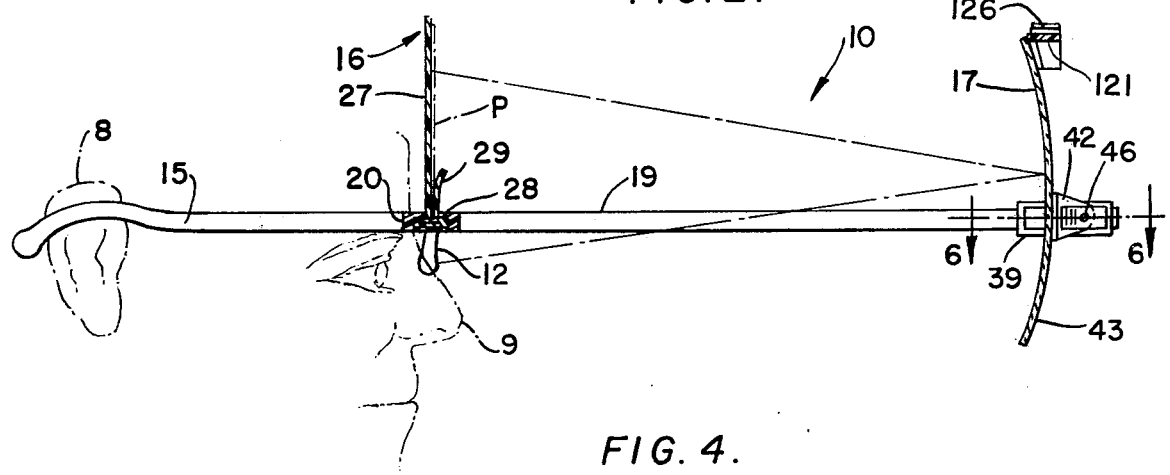
FIG.2.
FIG.3.   FIG.4.   FIG.5.
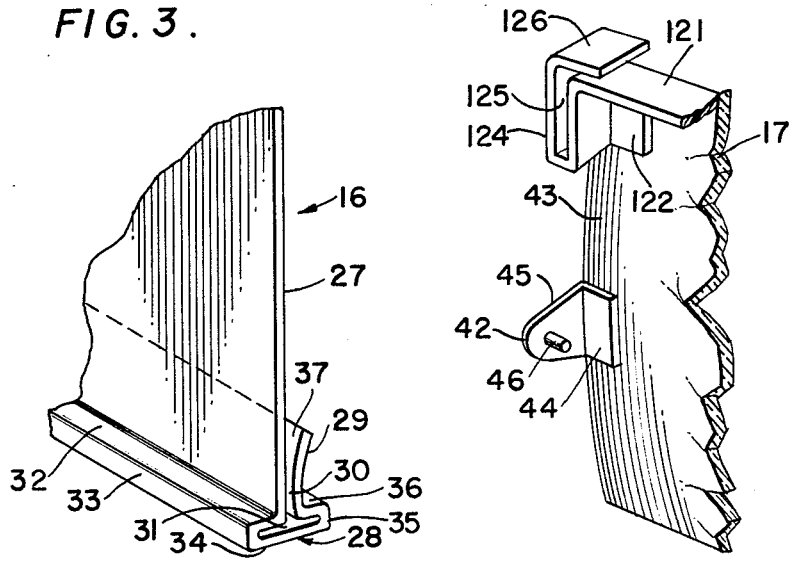
FIG.6.
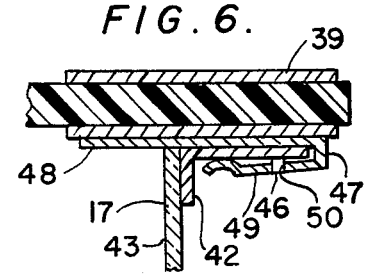

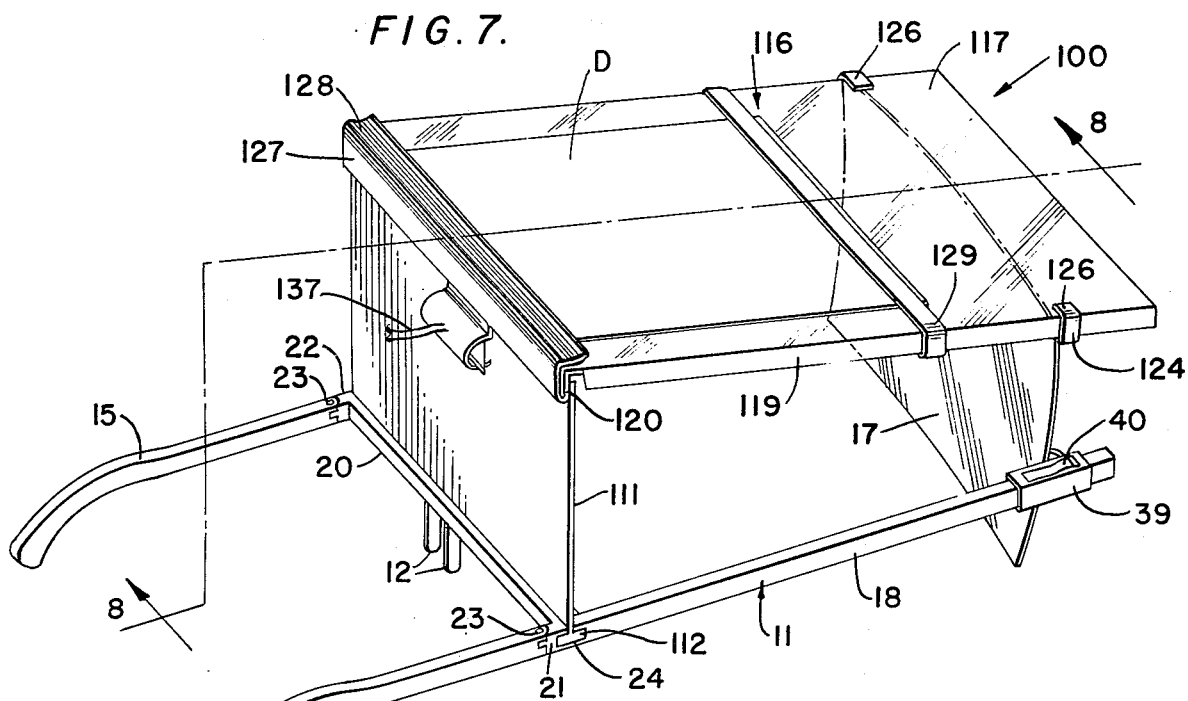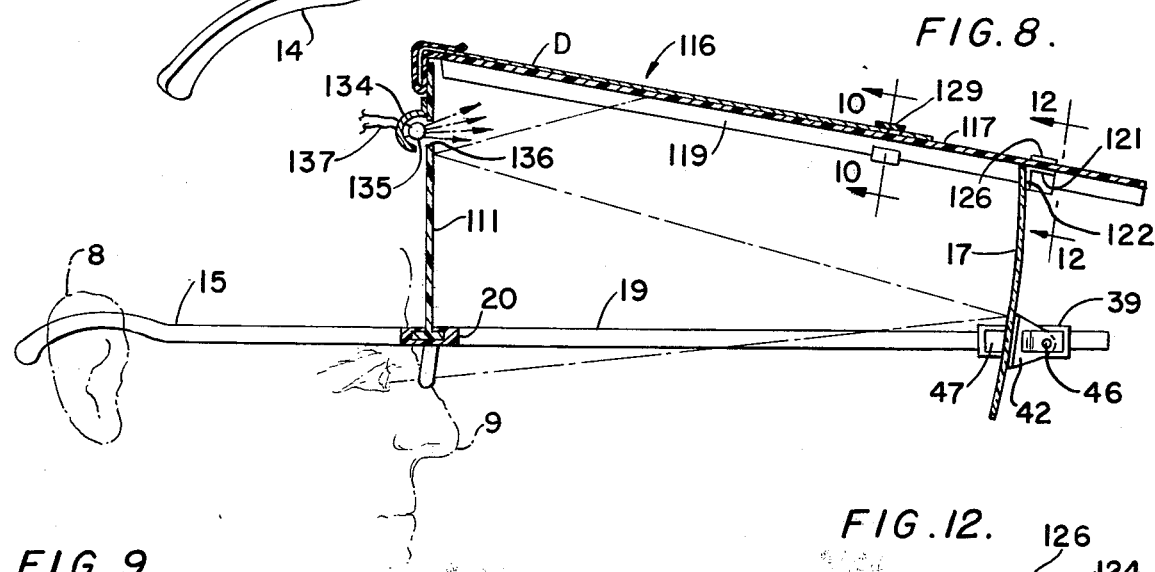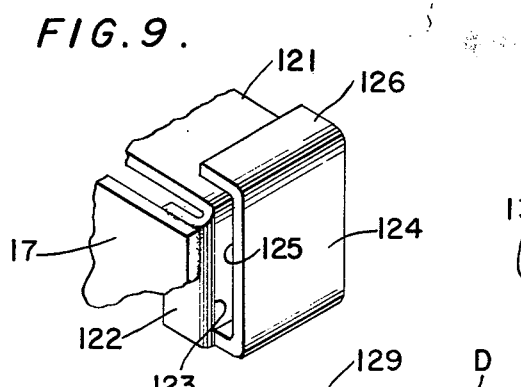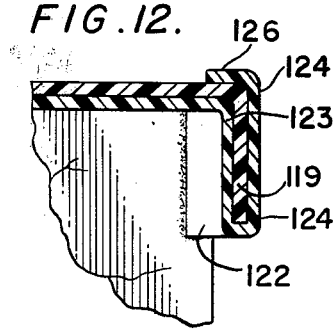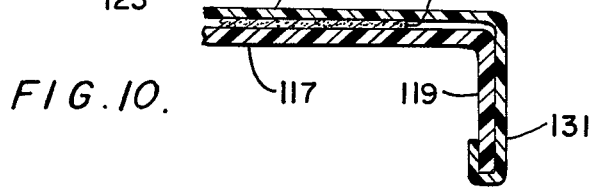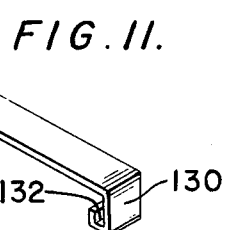

DOCUMENT READING APPARATUS

This invention relates to new and useful improvements in the art of optical apparatus and in particular concerns itself with apparatus worn by a viewer in the manner of a pair of spectacles for reflecting an image of a document supported by the apparatus into the eyes of the viewer when the eyes are raised and which apparatus is out of the view of the viewer when the eyes are lowered as when the viewer is reading at a desk or table.

This invention constitutes an improvement over the viewing device disclosed in my U.S. Pat. No. 3,671,117, issued June 20, 1972 with respect to simplicity of construction, reduction of weight and requiring only natural daylight for illumination instead of an artificial light source contained within the apparatus.

It is an object of the invention to provide a document reader which may be worn by the viewer in the manner of a pair of spectacles and which includes an elongated frame having a pair of parallel side bars connected at a pair of ends thereof by a crossbar, a pair of temples connected to the crossbar opposite the side bars for support over the ears of a viewer, a nose piece depending from the center of the crossbar, a document holder supported by and above said frame, and at least one mirror supported by said frame for reflecting an image of a document held within the document holder into the eyes of the viewer.

In one modification of the invention designed for reading a reversed image document, the document holder comprises a flat upstanding panel supported in an upwardly open slot extending longitudinally along the length of the crossbar and clamping means adjacent the flat panel for holding a document flat against the flat panel with the reversed image facing away from the viewer and the panel. A single mirror is adjustably supported in an upstanding position by the side bars to slide thereon with the mirror reflecting surface facing the reversed image of the document and the viewer. Adjustment of the mirror may be made by sliding it along the side bars until a suitable angle of incidence and reflection is obtained to reflect the image into the eyes of the viewer when the eyes are raised to a predetermined position.

In a second embodiment of the invention designed for reading a direct image of a document, the document holder is a flat panel supported in an inclined position above the frame by mounting one end of the panel to the top edge of a first upstanding mirror carried by the crossbar of the frame with the mirror surface facing away from the viewer, and by slidably mounting the other end of the flat panel to the top edge of a second mirror carried by the side bars with the mirror surface facing the first mirror and the viewer.

The flat panel is transparent so that a document which is placed on top of the panel with its indicia side down is visible from beneath the panel. The first mirror reflects a reversed image of the document toward the second mirror which in turn reflects an erected image of the document into the eyes of the viewer. Clamping means is provided in association with the transparent panel to clamp a document face down on top of the panel. An artificial light source may be provided to project light onto the underside of the document when there is insufficient external light available to illuminate the document.

With the foregoing objects and features in view and such other objects and features which may become apparent as this specification proceeds, the invention will be understood from the following description taken in conjunction with the accompanying drawings, wherein like characters of reference designate like parts and wherein:

FIG. 1 is a perspective view of one embodiment of the invention;

FIG. 2 is a vertical cross sectional view taken on line 2—2 of FIG. 1 illustrating the device in situ on a user;

FIG. 3 is a fragmentary perspective view of the document holder component of the apparatus shown in FIG. 1;

FIG. 4 is a fragmentary perspective view of the rear corner portion of the mirror component of the apparatus shown in FIG. 1;

FIG. 5 is a vertical sectional view taken on line 5—5 of FIG. 1;

FIG. 6 is a horizontal sectional view taken on line 6—6 of FIG. 2;

FIG. 7 is a perspective view of a second embodiment of the apparatus of the invention;

FIG. 8 is a vertical sectional view taken on line 8—8 of FIG. 7 illustrating the apparatus in situ on a user;

FIG. 9 is a fragmentary perspective view of a portion of the apparatus shown in FIG. 7;

FIG. 10 is a vertical sectional view taken on line 10—10 of FIG. 8;

FIG. 11 is a perspective view of the document holder clamp component of the apparatus illustrated in FIG. 7;

FIG. 12 is a vertical sectional view taken on line 12—12 of FIG. 8; and

FIG. 13 is an enlarged side elevational view of a portion of one of the side bars of the invention showing the slot therein.

Referring now to the accompanying drawings and particularly to FIGS. 1–6 one embodiment of the document reading apparatus of the invention is designated generally by the reference numeral 10 and comprises an elongated frame 11 adapted to be supported on a person's head in the manner of a pair of spectacles by a pair of nose pads 12, and a pair of temples 14, 15, a document holder 16 supported above the frame, and a mirror 17 adjustably mounted on the frame. The frame 11 includes a pair of horizontally spaced, parallel side bars 18 and 19 having near and far ends considered with respect to the intended position for use of the apparatus by the user. The near ends 21 and 22 are rigidly and integrally connected by a crossbar 20 perpendicular to the side bars. The temples 14 and 15 are hingedly connected to the near ends 21 and 22 respectively of side bars 18 and 19 by hinge pins 23, so as to swing from an extended position parallel to the side bars 18 and 19 to a folded position (not shown) adjacent the crossbar 20. The nose pads 12 depend centrally from beneath the crossbar 20 and are spaced to bridge the nose of a user in a well known manner as in a pair of spectacles. An upwardly opening slot 24 extends longitudinally along the entire length of the crossbar 20 and across the side bars 18 and 19. The slot 24 is shaped in the manner of an inverted T having a horizontaly elongated head portion 25 and a short vertical leg portion 26. The opposite ends of the slot 24 open outwardly from the outer sides of the side bars 18 and 19 respectively. The document holder 16 comprising an upstanding substantially flat panel 27 which is integrally connected along its bottom edge to a coextensive hollow base portion 28 of approximately the same size and shape as the head portion 25 of the slot 24. A clamping bar 29 is integrally joined to the base portion 28 on one side of the panel 27 remote from the temples and is separated from the panel 27 by a vertically extending throat 30 opening downwardly into the cavity 31 of the hollow base portion 28. The panel 27, the base portion 28 and the clamping bar 29 are all formed from one sheet of stiff plastic material by bending in seriatim the bottom of the sheet first perpendicularly outward relative to the bottom edge of the panel 27 to form a first top wall 32 of the base portion, then perpendicularly downward to form a first side wall 33 of the base portion, then perpendicularly inward to form a bottom wall 34 of the base portion, then perpendicularly upward to form a second side wall 35 of the base portion, then perpendicularly inward to form a second top wall 36 of the base portion and lastly perpendicularly upward to form the clamping bar 29. The upper edge 37 of the clamping bar 29 is flared outwardly away from the panel 27 in order to facilitate the ready insertion of the bottom edge of a document D into the throat 30 between the panel 27 and the clamping bar 29. The material from which the document holder is made, although it is relatively stiff so as to be shape sustaining, has sufficient resiliency to permit the clamping bar to be forced toward or away from the panel 27 from a normal unstressed position as shown in FIG. 3 and to return to its normal position once the distorting force is removed.

The mirror 17 is slidably supported on the side bars 18 and 19 by a pair of hollow sleeves 39, 39 which encompass the side bars and slide thereon to allow adjustment of the mirror 17 toward or away from the document holder 16. The upper walls of each of the sleeves 39 are provided with a resilient tongue 40 which is bent inwardly at 41 to provide a friction brake for engaging the side bars and retaining the sleeves in adjusted position relative to the side bars as seen in FIG. 5.

For rotatably supporting the mirror 17 relative to the sleeves 39, a pair of right angle trunion brackets 42 are affixed to the backside 43 of the mirror along opposite side edges thereof. The trunion brackets 42 each have a short leg 44 which is glued or otherwise affixed parallel to the mirror backside 43 and a long leg 45 projecting perpendicularly away from the backside 43. A trunion 46 is affixed perpendicularly to the longer leg 45 on the inside thereof and is spaced away from the backside 43. To support the trunions 46 on the sleeves 39 a J-shaped spring clip 47 is affixed along side each of the sleeves 39. The spring clips 47 each include a long support portion 48 secured by welding, gluing or other suitable means to the exterior surface of the inside wall of a sleeve 39, and a short clip portion 49 reversely bent back alongside the support portion 48. The legs 45 of the trunion brackets 42 are inserted between the clip portion 49 and the support portion 48 of the respective spring clips 47 with the trunions extending through bearing apertures 50 provided in the clip portions. The inward pressure of the clip portion 49 toward the support portion 48 and against the trunion bracket 42 results in frictional retension of the mirror 17 in rotatably adjusted position relative to the sleeves 39 until such time as a sufficient external force is applied to the mirror to rotate it to another adjusted position. The rotary adjustment of the mirror 17 varies the angle of reflection of the document image and determines the level to which the eyes of the user must be raised to see the reflected image. The mirror 17 is suitably curved for magnification of the document image. It is preferably a nonbreakable plastic mirror provided with a guide bar 121, (subsequently described) affixed adjacent the top edge of the mirror.

Referring now to FIGS. 7–12 a second embodiment of the invention is designated by the reference numeral 100. It is like embodiment 10 in that it comprises the same frame 11, nose pads 12, temples 14 and 15, remote mirror 17, sleeves 39 and the same mounting means for rotatably mounting the mirror 17 relative to the sleeves 39 as described with respect to embodiment 10. The frame 11 includes the side bars 18 and 19 and crossbar 20 provided with the upwardly open slot 24 extending longitudinally the entire length of the crossbar 20 and across the side bars 18 and 19. Since the aforesaid components are identical with corresponding components described with respect to the embodiment 10 additional description thereof is deemed unnecessary. The second embodiment 100 is intended for use in viewing documents having an erect image rather than for viewing a document with a reversed image for which the apparatus embodiment 10 is intended. A modified document holder 116 and a second mirror 111, which will be referred to as a near mirror, are thus provided which distinguish the embodiment 100 from the embodiment 10.

The near mirror 111 is preferably made of plastic and includes an integrally molded coextensive base portion 112 which is slidably mounted in the open slot 24, and a mirror surface facing the mirror 17, which hereafter will be referred to as a remote mirror.

The document holder 116 includes a transparent plastic panel 117 having downturned opposite side flanges 119, 119 and a downturned end flange 120 at its near end hooked over the top edge of the near mirror 111. The remote end of the document holder 116 is slidably supported on top of a guide bar 121 which is affixed by means of reversely bent tabs 122 on opposite sides thereof to the back upper side edges of the mirror 17 (See FIG. 9 where only one tab 122 is shown). The guide bar 121 has downturned flanges 123 on its opposite ends with reversely bent extensions thereof which form guide channels 125 for slidably receiving the downturned flanges 119 of the document holder 116. The ends 126 of the extensions 124 are turned inward over the guide bar 121 to hold the panel 117 against vertical displacement relative to the guide bar. The flange 120 at the near end of the document holder is provided with a reversely bent extension 127 which extends upwardly parallel to flange 120 and terminates in a narrow end strip 128 bent back over the panel 117. Slidably supported over the top of panel 117 is a flat document holding bar 129 which has opposite end portions 130 and 131 which are bent downwardly, inwardly and upwardly to form guide channels 132, 133 adapted to slidably receive the downturned flanges 119 of the panel 117 therein.

In positioning a document D in the document holder 116 the document is placed with indicia face down on top of the transparent panel 117. One end of the document is pushed between the end strip 128 and the panel 117 so that it is retained against vertical displacement. The document holding bar 129 is then slid forward over the other end of the document D so as to retain the other end of the document against vertical displacement.

If the user wearing the document reading apparatus 100 as illustrated in FIG. 9 is in a well lighted room, ordinarily sufficient light will be available to illuminate the document D through the open bottom and sides of the apparatus 100 so that the image on the underside of the document will be reflected first by the mirror 111 toward the mirror 17 and then reflected by the mirror 17 into the eyes of the user. However, an electric lamp 134 may be provided and supported near the top edge of the mirror 111 so that light from the bulb 135 shines through opening 136 in the mirror onto the document D. The lamp 134 is energized from an external source (not shown) through lamp cord 137.

It will be apparent from the above description that either embodiment 10 or 100 of the invention may be used depending upon whether the document to be viewed has reversed or erect indicia on its face. The invention allows the user to clear his work area of associated reference materials, while permitting the user to refer occasionaly to the indicia contained on the document D by lifting his eyes toward the mirror 17 in either embodiment. The material on the document may take the form of a test procedure, a schematic, a mechanical assembly, or whatever is necessary for the task the user is engaged in.

The materials used for making the invention are preferably as light and as thin as possible consistant with the requirements for strength and rigidity of the apparatus. Many synthetic resins are available which meet the requirements for strength and lightweight and are suitable for use in making the the apparatus of this invention. The document holder 16 in embodiment 10 and the document holder 116 in embodiment 100 are preferably made of transparent plastic material which will permit light to shine through the holder and document supported thereon.

While in the foregoing there has been described and shown the preferred embodiments of the invention, various modifications and equivalents may be resorted to within the spirit and scope of the invention as claimed. For example, the crossbar 20 of the frame 11 shown in FIG. 1 may be slightly curved in a horizontal plane in order to give the document holder 16 a slight curvature so that the document held therein has greater rigidity.

Also the trunnion bracket 42 illustrated in FIG. 4 may have an aperture in the place of the trunion 46 and the cooperating J-shaped clip 47 shown in FIG. 6 may have a stub shaft in the place of the aperture 50, so that the stub shaft on the clip will fit within the aperture provided in the angle bracket 42 for rotatable support of the mirror 17.

What is claimed is:

1. A document reading apparatus which may be worn on the head of a user in the manner of a pair of spectacles comprising an elongated frame having a near end which is worn in front of and close to the face of a user and a far end worn in front of and remote from the face of a user, a pair of temples connected to the near end of said frame and engageable over the ears of a user, a pair of spaced nose pads depending centrally from the near end of said frame between said temples and adapted to rest on the nose of a user, a document holder supported on and above said frame, and mirror means supported on said frame for reflecting the image appearing on a document held by said document holder into the eyes of a user, ssid frame including a pair of spaced parallel side bars having near and far ends, and a crossbar rigidly connecting the near ends of said side bars, there being a separate one of said temples hingedly connected to the near end of each of said side bars so as to swing from an extended position in parallel alignment with one of said side bars to a folded position along side of said crossbar, said pair of nose pads being dependently supported from said crossbar, an open, inverted T-shaped slot formed in said crossbar throughout its length, and extending across said side bars, said slot having an enlarged horizontally elongated head portion having ends opening outwardly of said bars, and a narrow vertical leg portion opening upwardly throughout its length, said document holder comprising a substantially flat upright panel having a horizontally elongated base portion integrally joined to the bottom edge of said upright panel of approximately the same size and shape of said head portion of said slot for sliding within said head portion, and clamping means secured to said base portion and extending upwardly adjacent said upright panel for holding a document against said upright panel, said mirror means comprising a single mirror adjustably mounted between said side bars on the remote side of said document holder to slide on said side bars toward and away from said near end.

2. The apparatus according to claim 1 wherein said base portion is hollow and includes a first top wall portion extending outwardly perpendicular to said upright panel, a first side wall depending from the outer edge of said first top wall portion, a bottom wall extending perpendicularly inward from the bottom edge of said first side wall, a second side wall extending upwardly from the edge of said bottom wall opposite said first side wall, a second top wall portion extending inwardly from the upper edge of said second side wall, and a clamping bar extending upwardly from the edge of said second top wall portion opposite said second side wall and along side of said upright panel, said clamping bar being said clamping means.

3. A document reading apparatus which may be worn on the head of a user in the manner of a pair of spectacles comprising an elongated frame having a near end which is worn in front of and close to the face of a user and a far end worn in front of and remote from the face of a user, a pair of temples connected to the near end of said frame and engageable over the ears of a user, a pair of spaced nose pads depending centrally from the near end of said frame between said temples and adapted to rest on the nose of a user, a document holder supported on and above said frame, and mirror means supported on said frame for reflecting the image appearing on a document held by said document holder into the eyes of a user, said frame including a pair of spaced parallel side bars having near and far ends, and a crossbar rigidly connecting the near ends of said side bars, there being a separate one of said temples hingedly connected to the near end of each of said side bars so as to swing from an extended position in parallel alignment with one of said side bars to a folded position along side of said crossbar, said pair of nose pads being dependently supported from said crossbar, an open, inverted T-shaped slot formed in said crossbar throughout its length, and extending across said side bars, said slot having an enlarged horizontally elongated head portion having ends opening outwardly of said bars, and a narrow vertical leg portion opening upwardly throughout its length, said mirror means comprising a remote upright mirror adjustably supported transversely between said side bars to slide thereon and to rotate about an axis which is transverse of said side bars, a near mirror having a base portion slibably received within said slot for supporting said near mirror in upright position on the near end of said frame, said document holder comprising a document supporting panel which is supported upon the top edges of the near and remote mirrors, and means for clamping a document on said document supporting panel so that the image on said document is relected first by said near mirror onto said remote mirror, and is then reflected by said remote mirror into the eyes of a user.

4. A document reading apparatus to be worn on the head of a user in the manner of a pair of spectacles comprising an elongated frame having a near end which is worn in front of and close to the face of a user and a far end worn in front of and remote from the face of a user, said frame including a pair of spaced parallel side bars having near and far ends and a crossbar rigidly connecting the near ends of said side bars, a pair of temples, there being a separate one of said temples hingedly connected to the near end of each of said side bars so as to swing from an extended position in alignment with one of said side bars to a folded position along side of said crossbar, nose engaging means on said crossbar for supporting the near end of said frame above the nose of a user, a document holder means for detachably holding a document sheet, means for supporting said document holder means on and above said frame and mirror means supported on said frame for reflecting an image appearing on a document held by said document holder into the eyes of a user wearing the document reading apparatus, said document holder means comprising an upright document support panel and clamping means for clamping a document sheet against said document support panel, said means for supporting said document holder means comprising an open slot formed in and extending longitudinally along said crossbar, and means on said document support panel interlockably engageable with said side open slot to hold said document support panel above and upright with respect to said crossbar, and said mirror means comprising an upright mirror supported transversely between said side bars intermediate the remote ends of said side bars and said crossbar with the mirror facing said document holder.

5. The apparatus according to claim 4 wherein said upright mirror is slidably mounted on said frame to move toward or away from said near end, and is rotatably mounted to rotate about an axis which is parallel to the plane of said upright panel.

6. A document reading apparatus to be worn on the head of a user in the manner of a pair of spectacles comprising an elongated frame having a near end which is worn in front of and close to the face of a user and a far end worn in front of and remote from the face of a user, said frame including a pair of spaced parallel side bars having near and far ends and a crossbar rigidly connecting the near ends of said side bars, a pair of temples, there being a separate one of said temples hingedly connected to the near end of each of said side bars so as to swing from an extended position in alignment with one of said side bars to a folded position along side of said crossbar, nose engaging means on said crossbar for supporting the near end of said frame above the nose of a user, a document holder means for detachably holding a document sheet, means for supporting said document holder means on and above said frame and mirror means supported on said frame for reflecting an image appearing on a document held by said document holder into the eyes of a user wearing the document reading apparatus, said mirror means comprising a remote upright mirror adjustably supported on the far end of said frame, and a near mirror supported in upright position on the near end of said frame, said document holder means comprising a document supporting panel which is supported upon the top edges of the near and remote mirrors, and means for clamping a document against said document supporting panel so that the image on said document is reflected first by said near mirror onto said remote mirror, and is then reflected by said remote mirror into the eyes of a user.

7. The apparatus according to claim 6 wherein said document supporting panel is transparent whereby a document supported on one side of said panel is visible from the other side of said panel.

* * * * *